US012032320B2

(12) United States Patent
Hirai

(10) Patent No.: US 12,032,320 B2
(45) Date of Patent: Jul. 9, 2024

(54) IMAGE FORMING APPARATUS WITH PARTICULARITY ARRANGED ELECTRIC BOARDS

(71) Applicant: CANON KABUSHIKI KAISHA, Tokyo (JP)

(72) Inventor: Ko Hirai, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/057,917

(22) Filed: Nov. 22, 2022

(65) Prior Publication Data

US 2023/0168622 A1 Jun. 1, 2023

(30) Foreign Application Priority Data

Nov. 30, 2021 (JP) ................................ 2021-194211

(51) Int. Cl.
*G03G 15/00* (2006.01)

(52) U.S. Cl.
CPC .................................. *G03G 15/80* (2013.01)

(58) Field of Classification Search
USPC ........................................................... 399/90
See application file for complete search history.

(56) References Cited

U.S. PATENT DOCUMENTS

| | | | | |
|---|---|---|---|---|
| 11,316,993 | B2 | 4/2022 | Wada | |
| 2020/0285188 | A1* | 9/2020 | Okamoto | G03G 15/5016 |
| 2020/0310327 | A1* | 10/2020 | Kanno | G03G 21/1619 |
| 2020/0310329 | A1* | 10/2020 | Shuhama | G03G 15/80 |

FOREIGN PATENT DOCUMENTS

JP 2021070264 A 5/2021

* cited by examiner

*Primary Examiner* — Quana Grainger
(74) *Attorney, Agent, or Firm* — ROSSI, KIMMS & McDOWELL LLP

(57) ABSTRACT

An image forming apparatus includes an image formation unit, a casing, a sheet discharge unit, a supporting portion, a first electric board, a second electric board, and a connecting cable. The first electric board is disposed such that the first electric board does not overlap the supporting portion in a width direction when viewed in the vertical direction. The second electric board is disposed such that the second electric board does not overlap the supporting portion in the width direction when viewed in the vertical direction. The second electric board is disposed on a same side in the width direction as the first electric board with respect to the supporting portion when viewed in the vertical direction. At least a part of the second electric board overlaps the first electric board in the vertical direction and the sheet discharge direction when viewed in the width direction.

18 Claims, 8 Drawing Sheets

IMAGE FORMING APPARATUS WITH PARTICULARITY ARRANGED ELECTRIC BOARDS

BACKGROUND OF THE INVENTION

Field of the Invention

This disclosure relates to an image forming apparatus such as a printer, a copier, a facsimile, or an integrated machine.

Description of the Related Art

Recently, an image forming apparatus such as a printer, a copier, a facsimile, or an integrated machine is capable of forming an image on a recording material based on the image data stored in a recording medium such as a universal serial bus (USB) memory. So as to achieve this, a USB port for allowing a user to insert and remove the USB memory, and a USB board for performing the input/output control of the image data between the USB memory inserted into the USB port and an apparatus-side memory (for example, a random-access memory (RAM) and the like) are disposed in the image forming apparatus (refer to Japanese Patent Laid-Open No. 2021-70264).

Unlike an input/output interface such as a local area network (LAN) port for connecting to an external apparatus such as a personal computer in a manner capable of inputting and outputting the data in the image forming apparatus, the USB port is disposed in a place where the user is easy to access. In a case of the apparatus described in Japanese Patent Laid-Open No. 2021-70264, the USB port is, when viewed from a front face, disposed in a place on a front side of a left side face of the apparatus so as to allow the user to insert and remove the USB memory in a left-right direction. Then, the USB board is connected to a main board disposed on a back side of a left side face cover in a manner capable of inputting and outputting the data via a connecting cable.

Hitherto, the USB port and the main board are disposed with a distance of approximately 100 to 200 mm in between. Therefore, a long connecting cable is used, and it is labor intensive and troublesome that a worker performing assembly and maintenance is required to connect the USB board and the main board to each other by taking into consideration the routing of the connecting cable inside of the apparatus. Further, since the long connecting cable is susceptible to an electromagnetic disturbance, it is necessary to dispose a protection member for protecting the connecting cable from the electromagnetic disturbance inside of the apparatus. However, then the cost of the image forming apparatus is increased, and it is not preferred because, since the size of the apparatus is enlarged due to the necessity to secure space inside of the apparatus for routing the connecting cable, including the protection member, it is contrary to a recent request for the miniaturization of the image forming apparatus.

In view of the problems described above, the purpose of this disclosure is to provide the image forming apparatus that is capable of achieving the cost containment and the miniaturization of the apparatus while ensuring the good accessibility to the USB port for the user.

SUMMARY OF THE INVENTION

According to a first aspect of the present invention, an image forming apparatus includes an image formation unit configured to form an image on a recording material, a casing accommodating the image formation unit, a sheet discharge unit configured to discharge a recording material on which an image is formed by the image formation unit from an inside of the casing, a supporting portion disposed on an upper part of the casing in a vertical direction and configured to support a recording material discharged by the sheet discharge unit, a first electric board disposed in the casing in such a manner that the first electric board does not overlap the supporting portion in a width direction intersecting with the vertical direction and a sheet discharge direction of a recording material by the sheet discharge unit when viewed in the vertical direction, a second electric board including a medium insertion and removal portion in which an insertion port into which a recording medium is insertable is formed, the second electric board being configured to control an operation of data readout from a recording medium inserted into the insertion port, and a connecting cable configured to connect the first electric board and the second electric board to each other. The second electric board is disposed in the casing in such a manner that the second electric board does not overlap the supporting portion in the width direction when viewed in the vertical direction. The second electric board is disposed on a same side in the width direction as the first electric board with respect to the supporting portion when viewed in the vertical direction. At least a part of the second electric board overlaps the first electric board in the vertical direction and the sheet discharge direction when viewed in the width direction.

Further features of the present invention will become apparent from the following description of exemplary embodiments with reference to the attached drawings.

DESCRIPTION OF THE EMBODIMENTS

Image Forming Apparatus

Figure 1:
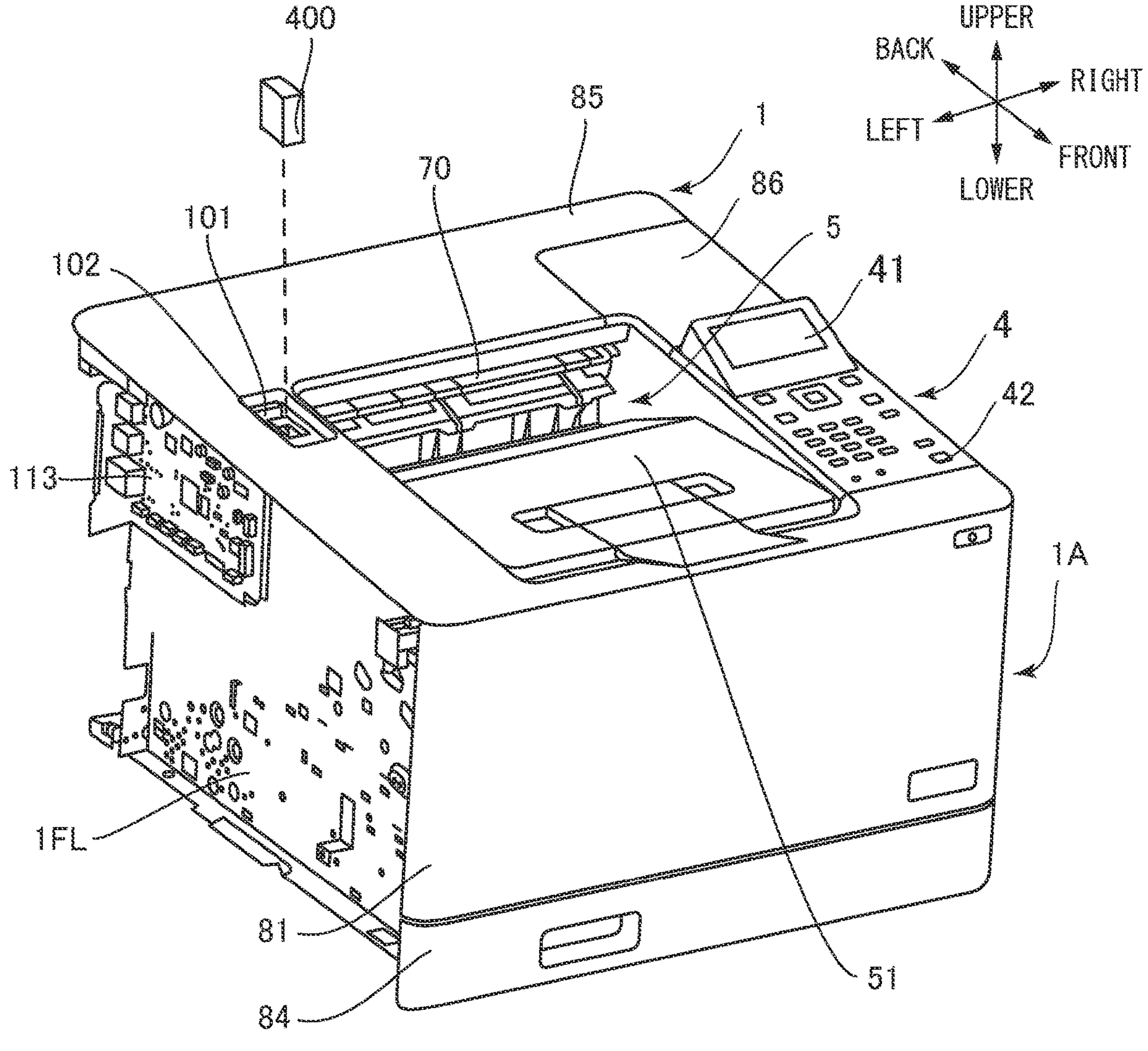
FIG. 1 is a perspective view showing an image forming apparatus as viewed from a front face side.

Hereinafter, this embodiment will be described. First, an overview of an image forming apparatus of this embodiment will be described using FIGS. 1 to 3. As shown in FIG. 1, the image forming apparatus 1 of this embodiment is an image forming apparatus of an upper face discharge type in which a sheet discharge opening portion 5, serving as space for discharging a recording material from the inside of a casing 1A (inside of the casing), is formed on an upper face which is an upper side portion of the casing 1A. A sheet discharge tray 51, serving as a supporting portion for loading the recording material discharged from the inside of the casing 1A, is disposed in the sheet discharge opening portion 5. In the image forming apparatus 1 of this embodiment, the recording material on which an image has been formed is discharged from the inside of the casing 1A to the sheet discharge tray 51 in a sheet discharge direction from a back face (back) side toward a front face (front) side. Further, an operation unit 4 operable for operating the image forming apparatus 1 by a user is disposed on the upper face of the casing 1A.

To be noted, in this description, a side on which a user stands at the time of operating the operation unit 4 so as to operate the image forming apparatus 1 is referred to as the front face (or front), and the opposite side is referred to as the back face (or back). Further, a right side when viewed from the front face is referred to as right and a first end side, and a left side when viewed from the front face is referred to as left and a second end side. Further, an upper side when viewed from the front face is referred to as "upper", and a lower side when viewed from the front face is referred to as "lower". Therefore, in a case of the embodiment shown in FIG. 1, when viewed from the front face, the operation unit 4 is disposed to the right side than the center in the upper side of the casing 1A.

The casing 1A includes, for example, with respect to the left-right direction, a left side plate frame 1FL, serving as a hold member for holding a left end side of an image formation unit 300 (refer to FIG. 3 described below), a right side plate frame, not shown, holding a right end side of the image formation unit 300, and a plurality of sheet metals such as a stay, not shown, for connecting these left side plate frame 1FL and right side plate frame to each other. An outer circumference and the upper face of the casing 1A are covered by an exterior cover configuring the appearance of the image forming apparatus 1. The casing 1A includes a front cover 81 and a cassette cover 84 on the front face side as the exterior cover. As shown in FIG. 1, the front cover 81 is disposed to the upper side of the cassette cover 84 in the vertical direction. The front cover 81 is detachably disposed from the casing 1A, and the cassette cover 84 is provided to a cassette 40 (refer to FIG. 3) and disposed in a manner withdrawable from the casing 1A toward the front face integrally with the cassette 40.

Figure 2:
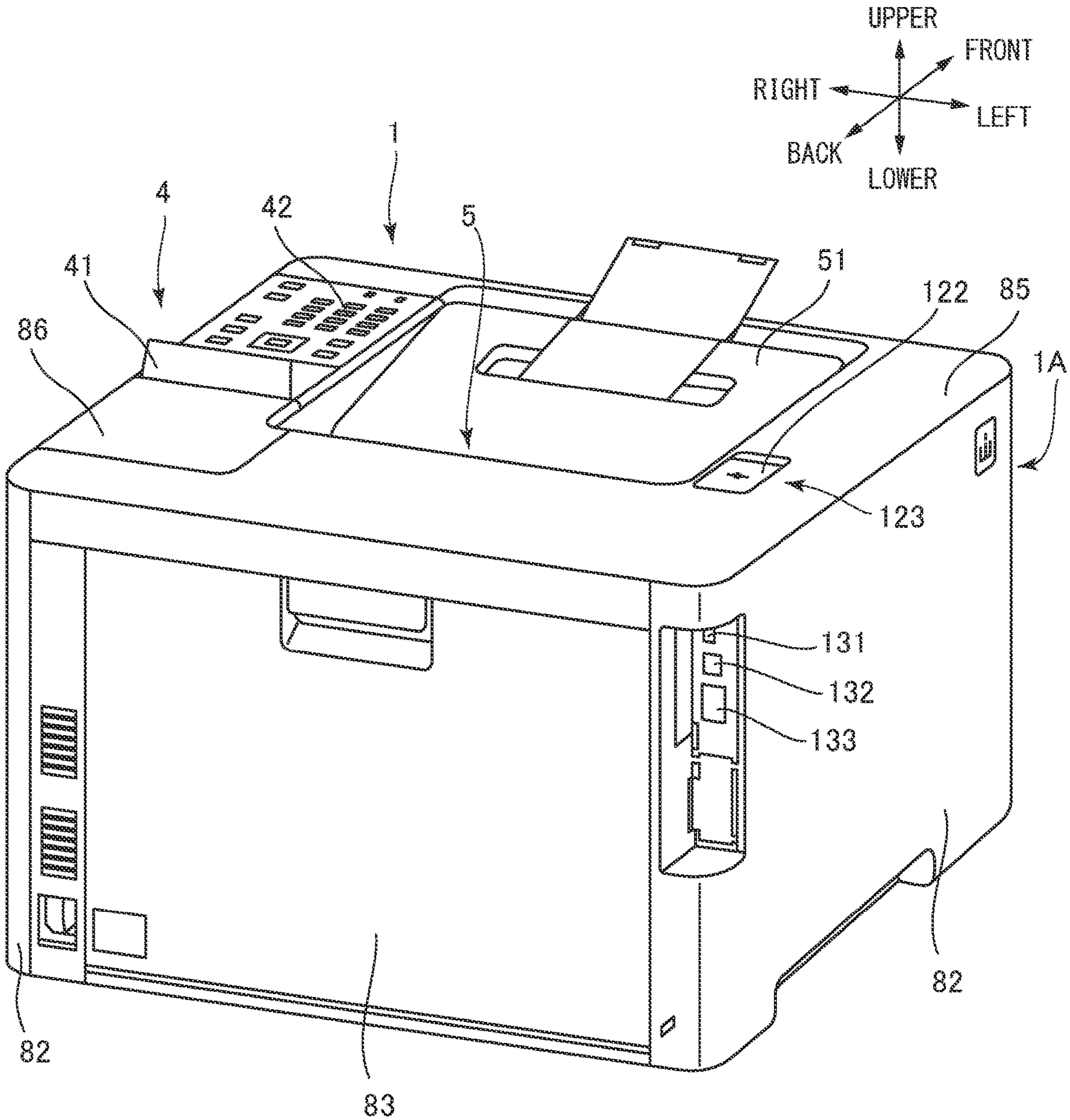
FIG. 2 is a perspective view showing the image forming apparatus as viewed from aback face side.

Further, as shown in FIG. 2, the casing 1A includes side face covers 82 respectively covering the left and the right side, and a back face cover 83 covering the back face. The side face covers 82 and the back face cover 83 serve as the exterior cover. Further, the casing 1A includes an upper face cover 85 and a support cover 86, both serving as the exterior cover, and these covers form the upper face (top face) of the casing 1A. The sheet discharge tray 51 is disposed on the upper face cover 85, and the operation unit 4 is disposed on the support cover 86. The operation unit 4 includes a display 41 and an input unit 42 having buttons, switches, and the like. With respect to the left-right direction (that is, width direction intersecting with the vertical direction and the sheet discharge direction of the recording material P by a sheet discharge unit 70 (refer to FIG. 3)), the operation unit 4 is disposed to an end side on the outside than the sheet discharge unit 70 (in this embodiment, the opposite side of the left side plate frame 1FL). The operation unit 4 is disposed on the first end side of the casing 1A in the left-right direction in such a manner that the operation unit 4 does not overlap the sheet discharge unit 70 in the left-right direction when viewed in the vertical direction.

To be noted, it is acceptable that the upper face cover 85 and the support cover 86 are disposed integrally with each other, and, further, acceptable that the upper face cover 85, the support cover 86, and the sheet discharge tray 51 are disposed integrally with each other. Further, it is acceptable that the display 41 is a touch panel allowing an operation similar to the input unit 42 such as, for example, the input of an image forming job and the selection of the recording material P in response to a touch operation of the user on a screen.

Figure 3:
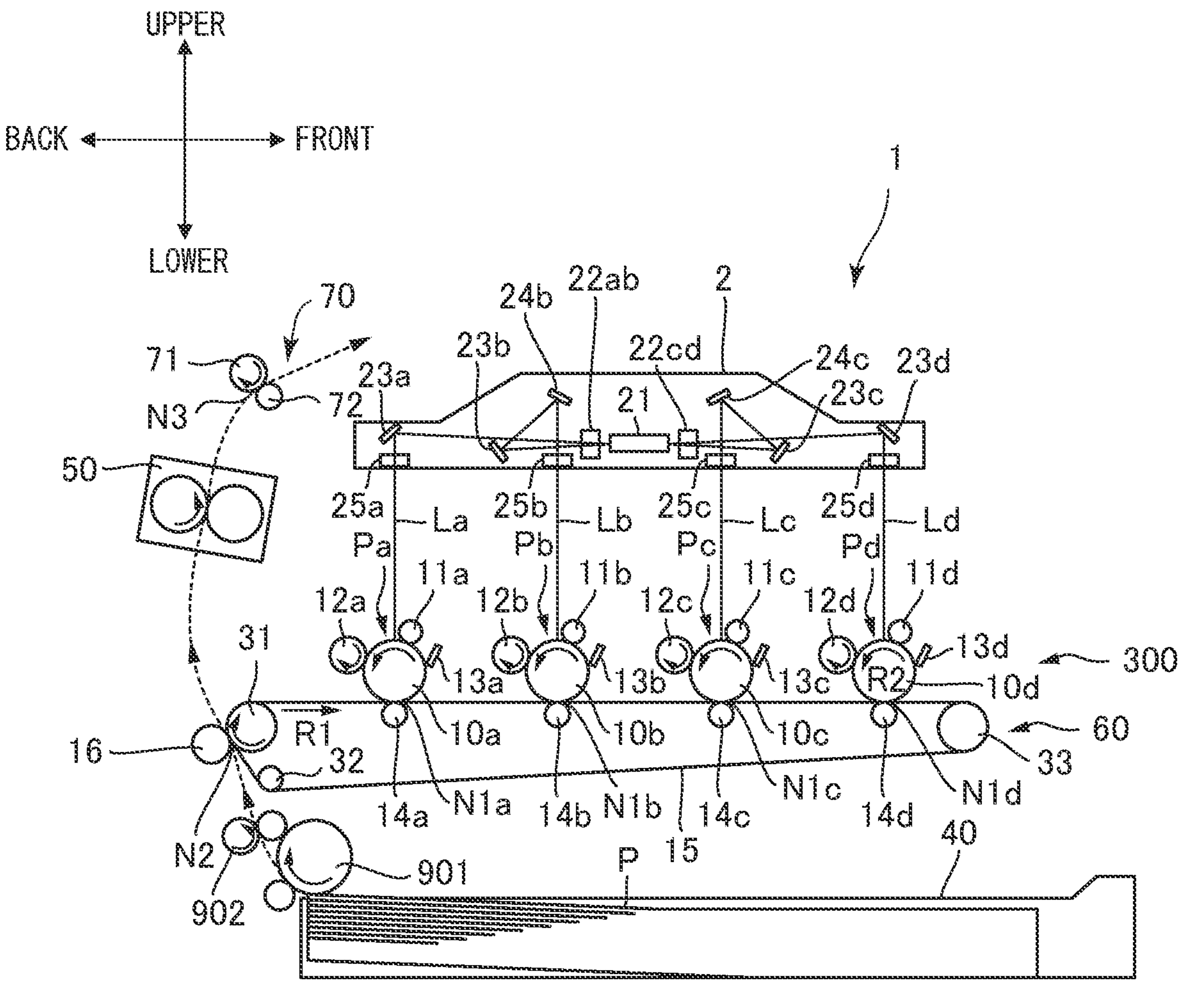
FIG. 3 is a schematic view showing a configuration of the image forming apparatus.

Next, a configuration of the image forming apparatus 1 relating to image formation will be described using FIG. 3. As shown in FIG. 3, the image forming apparatus 1 of this embodiment is a full color printer of an electrophotographic system including image forming units Pa, Pb, Pc, and Pd of yellow, magenta, cyan, and black disposed along an intermediate transfer belt 15. The image forming apparatus 1 receives image data from an external apparatus, not shown, such as a USB memory and a personal computer, and is capable of forming a toner image on a recording material P based on the received image data. The recording material P includes various kinds of sheet materials which include paper such as standard paper, cardboard, rough paper, uneven paper, and coated paper, a plastic film, cloth, and the like.

As shown in FIG. 3, in this embodiment, an intermediate transfer unit 60 is disposed to the lower side of the image forming units Pa to Pd. The intermediate transfer unit 60 is configured such that an endless intermediate transfer belt 15 is moved in an arrow R1 direction by being stretched over a plurality of rollers 31, 32, and 33. A secondary transfer outer roller 16 is disposed in a position facing the roller 31 stretching the intermediate transfer belt 15 across the intermediate transfer belt 15, and forms a secondary transfer nip portion N2 for transferring the toner image borne on the intermediate transfer belt 15 onto the recording material P. The secondary transfer nip portion N2 is a nip portion formed by the roller 31 and the secondary transfer outer roller 16, and, for example, the toner image is transferred onto the recording material P in response to the application of a secondary transfer voltage from a power source, not shown, to the secondary transfer outer roller 16.

A process to form, for example, a full color image of four colors by the image forming apparatus 1 will be described. However, the four image forming units Pa to Pd included in the image forming apparatus 1 are substantially the same in a configuration except for differences in developing colors. Therefore, the image forming unit Pd of black will be described as a representative, and descriptions of the other image forming units Pa to Pc will be omitted herein.

The image forming unit Pd includes a photosensitive drum 10*d*, serving as a photosensitive member. The photosensitive drum 10*d* is rotatably driven in an arrow R2 direction by a drum driving motor, not shown. A charge unit 11*d*, a developing unit 12*d*, a primary transfer roller 14*d*, and a cleaning unit 13*d* are disposed around this photosensitive drum 10*d*.

When an image forming operation has started, at first, a surface of the rotating photosensitive drum 10*d* is uniformly charged by the charge unit 11*d*. Next, the surface of the charged photosensitive drum 10*d* is exposed by a laser beam Ld irradiated from an exposing unit 2 corresponding to an image signal. Thereby, an electrostatic latent image corresponding to the image signal is formed on the photosensitive drum 10*d*. The electrostatic latent image formed on the photosensitive drum 10*d* is developed to the toner image with the developer stored inside of the developing unit 12*d*. In a case of this embodiment, one single exposing unit 2 is disposed above the image forming units Pa to Pd, and the plurality of photosensitive drums 10*a* to 10*d* are exposed only by the one single exposing unit 2. That is, the one single exposing unit 2 is shared by the plurality of image forming units Pa to Pd for exposure.

The toner image formed on the photosensitive drum 10*d* is primarily transferred onto the intermediate transfer belt 15 in a primary transfer portion N1*d* formed with the primary transfer roller 14*d* disposed across the intermediate transfer belt 15. At this time, a primary transfer voltage is applied from a power source, not shown, to the primary transfer roller 14*d*. The intermediate transfer belt 15 bears and conveys the toner image transferred from the photosensitive drum 10*d*. To be noted, an adhering matter such as a toner remained on the surface of the photosensitive drum 10*d* after the primary transfer is collected by the cleaning unit 13*d*.

The image forming units Pato Pd of yellow, magenta, cyan, and black perform these operations in sequence, and superimpose the toner images of the four colors on the intermediate transfer belt 15. Thereafter, the recording material P stored in the cassette 40 is conveyed to the secondary transfer nip portion N2 in the timing synchronizing with the formation of the toner image.

The cassette 40 is disposed in the lower side of the casing 1A (refer to FIG. 1), and is capable of storing a large number of sheets of the recording material P A sheet feed roller 901 feeds the recording material P from the cassette 40 toward a registration roller 902 one sheet at a time. The registration roller 902 corrects the skew of the recording material P, and conveys the recording material P to the secondary transfer nip portion N2 synchronously with the toner image on the intermediate transfer belt 15. Then, in response to the application of the secondary transfer voltage from a power source, not shown, to the secondary transfer outer roller 16, the toner image on the intermediate transfer belt 15 is secondarily transferred onto the recording material P.

The recording material P onto which the toner image has been secondarily transferred is conveyed to a fixing unit 50. The fixing unit 50 heats and presses the recording material P while conveying the recording material P, and fixes the toner image on the recording material P The recording material P on which the toner image has been fixed by the fixing unit 50 is conveyed upward (i.e., vertical conveyance), and is loaded on the sheet discharge tray 51 (refer to FIG. 1) by being discharged from the inside of the casing 1A to the outside toward the front face by the sheet discharge unit 70. The sheet discharge unit 70 includes a first roller 71 and a second roller 72. The first and second rollers 71 and 72 form a sheet discharge nip portion N3 capable of nipping and conveying the recording material P by coming into contact with each other, and discharge the recording material P toward an obliquely upward direction from the inside of the casing 1A.

To be noted, in this embodiment, the image forming units Pa to Pd, the intermediate transfer unit 60, the secondary transfer outer roller 16, and the like described above are included in the image formation unit 300 which forms the toner image on the recording material P Further, the exposing unit 2, the image formation unit 300, the fixing unit 50, the sheet feed roller 901, the registration roller 902, the sheet discharge unit 70, and the cassette 40 described above are housed inside of the casing 1A (refer to FIG. 1).

The image forming apparatus 1 includes electric boards such as, for example, a laser circuit board controlling the exposing unit 2, an operation unit circuit board operating the operation unit 4 as the touch panel and the like, a USB board, and a main control board. These electric boards are boards on which a central processing unit (CPU), memories such as a read-only memory (ROM) and a random-access memory (RAM), an electronic component, an electrical component, and a port for data input/output are mounted. The electric boards include, other than the above, a drive circuit board driving a motor, a power supply board applying voltage to various types of equipment, and the like. These electric boards are electrically connected to each other with a connecting cable. To be noted, in this description, the connecting cable is not limited to one single signal line, but also includes a wire bundle in which a plurality of signal lines are bundled.

Main Control Board

Referring back to FIG. 1, the image forming apparatus 1 includes the main control board 113. The main control board 113, serving as a first electric board, is an electric board which performs the control of the whole of the image forming apparatus 1, and is disposed to the outside than the sheet discharge tray 51 in the casing 1A with respect to the left-right direction (in this embodiment, on the side of the left side plate frame 1FL). The main control board 113 is disposed in the casing 1A in such a manner that the main control board 113 does not overlap the sheet discharge tray 51 and the sheet discharge unit 70 in the left-right direction when viewed in the vertical direction. As described below, the main control board 113 is supported by a board support plate 114 together with the USB board 150 (refer to FIG. 4), and is secured to a predetermined position in the casing 1A by screwing the board support plate 114 to the left side plate frame 1FL. To be noted, the left side of the side face covers 82 shown in FIG. 2 is provided to the outside of the main control board 113 shown in FIG. 1. That is, the left side of the side face covers 82 is disposed in such a manner that the side face covers 82 does not overlap the left side plate frame 1FL and the main control board 113 in the left-right direction when viewed in the vertical direction.

As shown in FIG. 2, two USB ports 131 and 132 and one LAN port 133, serving as interfaces for inputting and outputting the data from and to the external apparatus such as the personal computer, are mounted on the main control board 113. These ports are not covered with a cover so as to allow the user to quickly attach and detach USB and LAN cables. Since these ports are sorts of things to which the cable is connected at all times or over a long period of time, these ports are disposed to the back face side of the casing 1A so as not to allow the connecting cable to hamper the user after the connecting. USB Port Further, as shown in FIG. 1, in the image forming apparatus 1, a USB port 101 for a USB memory 400 is disposed in the casing 1A. An insertion opening 102, serving as an insertion port, capable of inserting the USB memory 400, serving as a recording medium, is formed in the USB port 101, serving as a medium insertion and removal portion, and the insertion opening 102 is exposed from an opening 123 formed in the upper face of the casing 1A. With respect to the sheet discharge direction of the recording material P by the sheet discharge unit 70, the USB port 101 is disposed downstream of the pair of sheet discharge rollers (the first and second rollers 71 and 72, refer to FIG. 3). Further, the USB port 101 is disposed between the main control board 113 and the sheet discharge tray 51 with respect to the left-right direction, and above the left side plate frame 1FL.

To be noted, an opening/closing cover 122 (refer to FIG. 2) is disposed on the casing 1A so as to prevent a foreign substance from entering into the insertion opening 102 of the USB port 101 at the time when the USB memory 400 is not attached. The opening/closing cover 122 is disposed in a manner movable between an opening position where the insertion opening 102 is opened for allowing the user to insert the USB memory 400 and a closed position where the insertion opening 102 is closed for not allowing the user to insert the USB memory 400. That is, the opening/closing cover 122 is capable of opening and closing the opening 123, and disposed in a manner movable between the opening position for allowing the insertion and removal of the USB memory 400 into and from the insertion opening 102 and the closed position where the opening 123 is closed.

USB Board

Next, with reference to FIGS. 1 and 2, the USB board and the board support plate will be described using FIGS. 4 to 7. In the case of this embodiment, as shown in FIG. 5, the USB port 101 for the USB memory 400 is mounted on the USB board 150. The USB board 150, serving as a second electric board, is an electric board capable of controlling an operation of data readout from the USB memory 400 inserted into the insertion opening 102 of the USB port 101. In this embodiment, the USB port 101 is disposed such that an insertion/removal direction of the USB memory 400 is the vertical direction with respect to the insertion opening 102. The USB board 150 mounting the USB port 101 is electrically connected to the main control board 113 in a manner capable of inputting and outputting the data via a connecting cable 115. Thereby, the main control board 113 is able to store the image data in the memory (for example, the RAM and the like), not shown, by retrieving the image data stored in the USB memory 400 inserted into the insertion opening 102 of the USB port 101.

Board Support Plate

Figure 4:
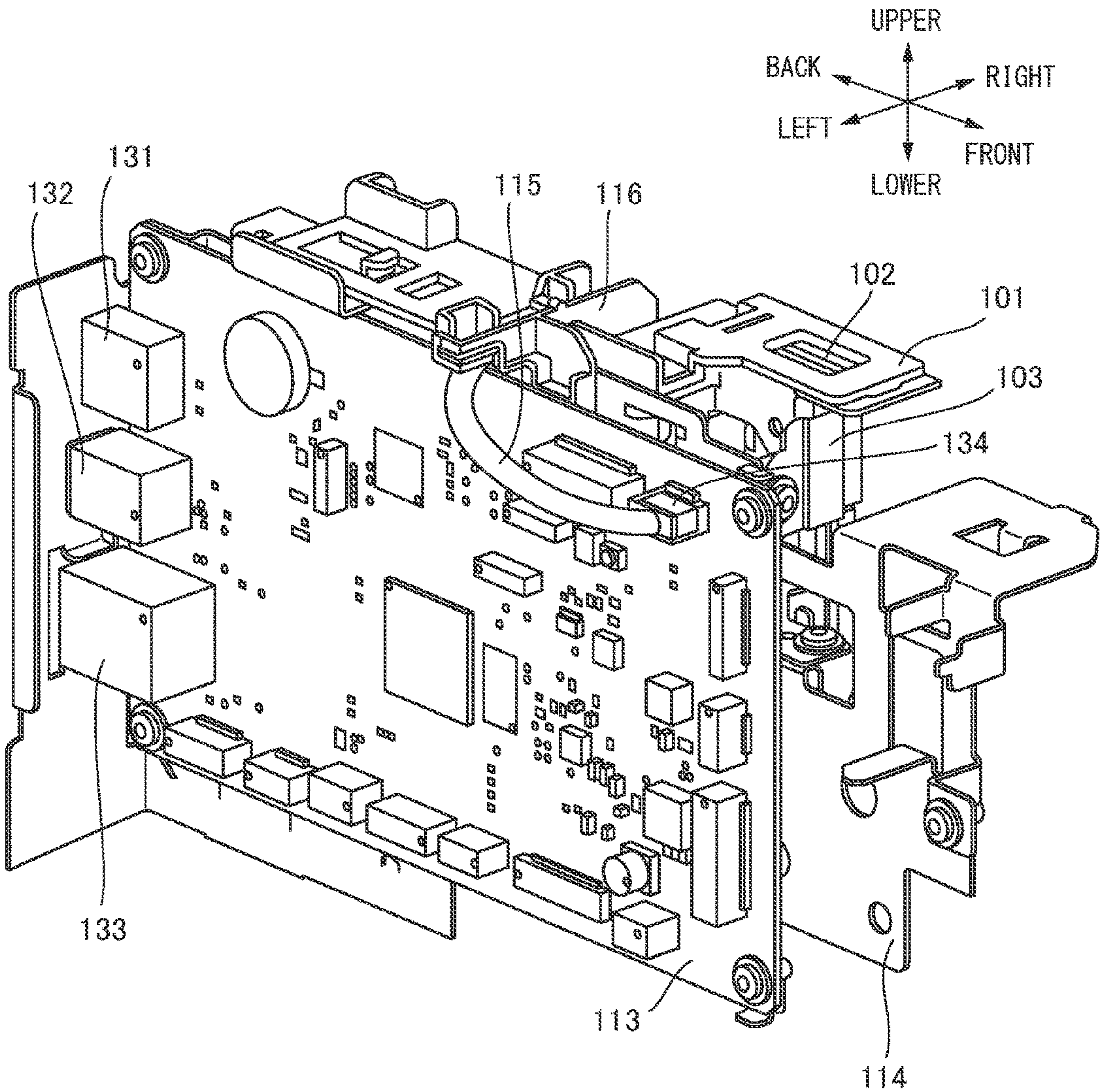
FIG. 4 is a perspective view showing a board support plate as viewed from a side of a main control board.
Figure 5:
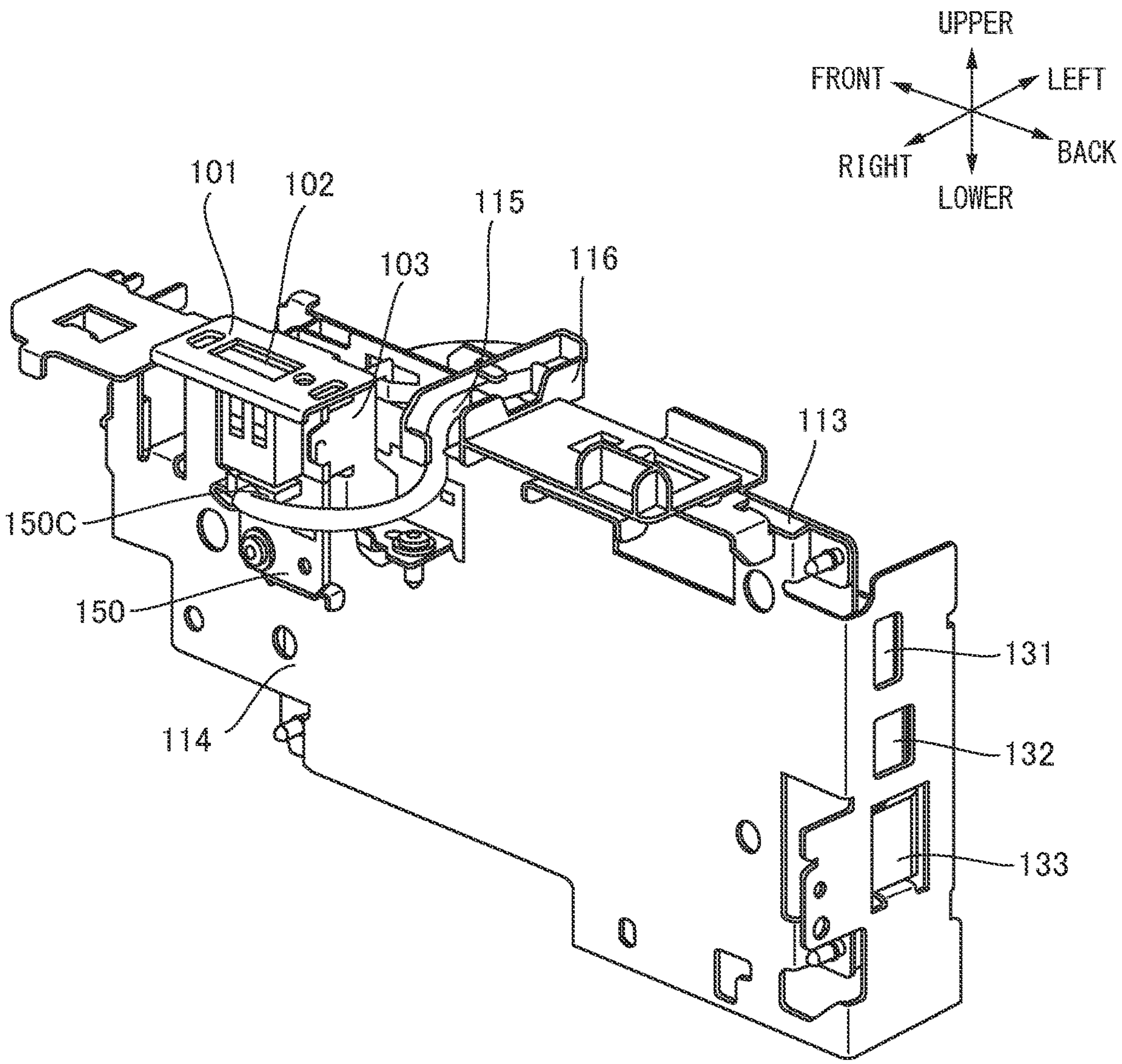
FIG. 5 is a perspective view showing the board support plate as viewed from a side of a USB board.

As shown in FIGS. 4 and 5, both of the main control board 113 and the USB board 150 are supported by the plate shaped board support plate 114. The main control board 113 mounting the USB ports 131 and 132 and the LAN port 133 is supported on a first surface side of the board support plate 114, serving as a support member. The board support plate 114 supports the main control board 113 in such a manner that a surface of the main control board 113 faces the surface of the board support plate 114. In this embodiment, the main control board 113 includes a first mounting surface 113*a* and a first back surface 113*b* opposite to the first mounting surface 113*a*. The first back surface 113*b* faces the surface of the board support plate 114. Also, the main control board 113 is disposed such that the first mounting surface 113*a* faces the left-right direction.

On the other hand, the USB board 150 mounting the USB port 101 is supported on a second surface side, opposite to the first surface side supporting the main control board 113, of the board support plate 114. The board support plate 114 supports the USB board 150 in such a manner that a surface of the USB board 150 faces the surface of the board support plate 114. In this embodiment, the USB board 150 includes a second mounting surface 150*a* and a second back surface 150*b* opposite to the second mounting surface 150*a*. The second back surface 150*b* faces the surface of the board support plate 114. Also, the USB board 150 is disposed such that the second mounting surface 150*a* faces the left-right direction. The USB board 150 is supported by the board support plate 114 in such a manner that the USB port 101 is disposed downstream of the center of the main control board 113 with respect to the sheet discharge direction of the recording material P (toward the front).

A support base 103 supporting the USB port 101 is disposed on the second surface side of the board support plate 114 in a manner extending from the board support plate 114 in an orthogonal direction with respect to a surface of the second surface side. The support base 103 is disposed so as to prevent the application of excessive force to the USB board 150 at the time of the insertion and removal of the USB memory 140 into and from the USB port 101.

Figure 7:
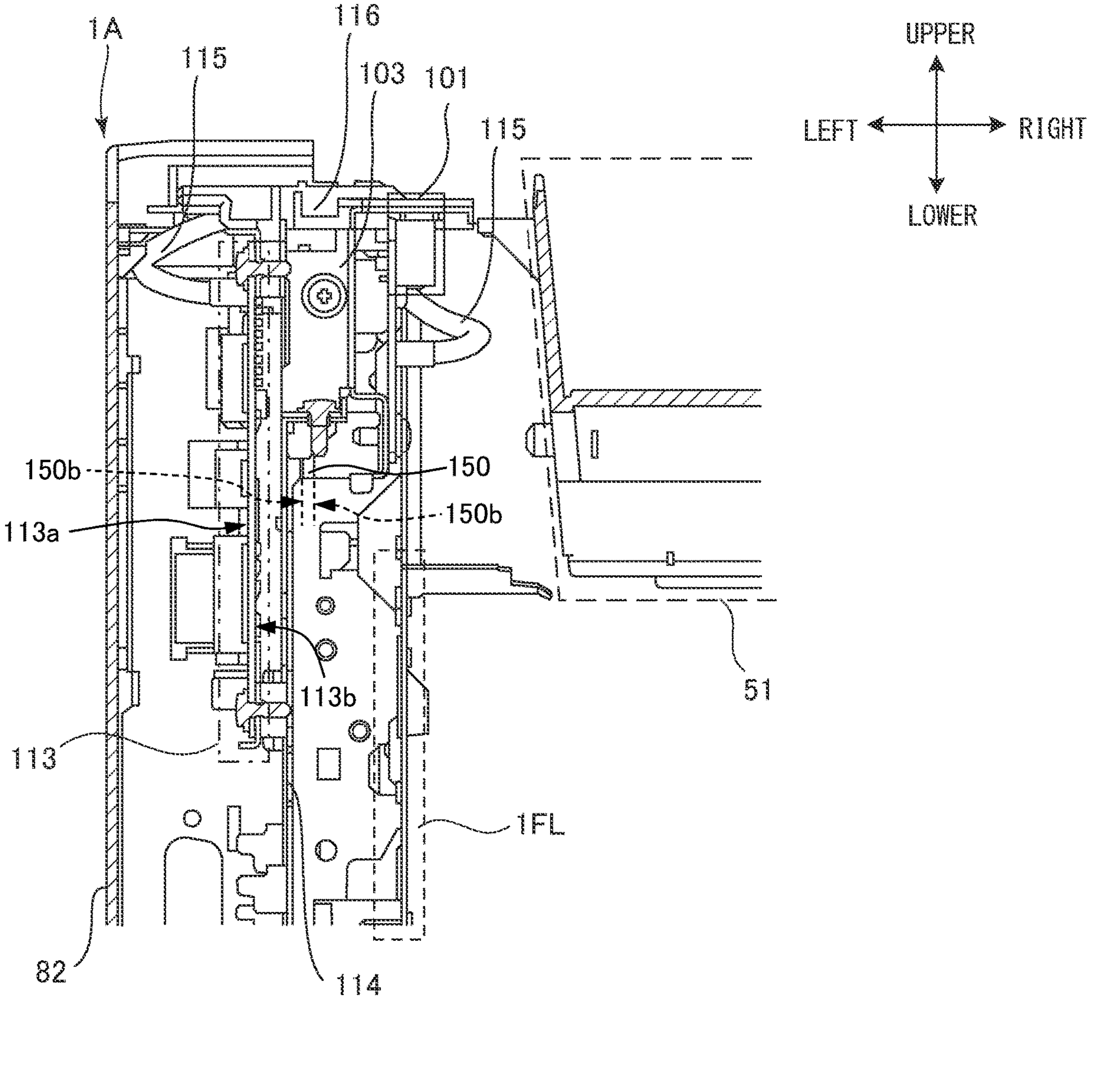
FIG. 7 is an enlarged view showing, in an enlarged manner, a part of a board unit as viewed from the front face side.

As described above, the USB board 150 and the main control board 113 are supported on both surfaces of the board support plate 114 in such a manner that the respective surfaces face each other. That is, the USB board 150 and the main control board 113 are disposed in such a manner that the first back surface 113*b* faces the second back surface 150*b*. Then, in this embodiment, the USB board 150 is supported by the board support plate 114 in such a manner that, as viewed along the left-right direction as illustrated in FIG. 7, at least a part of the USB board 150 overlaps the main control board 113 in the vertical (upper-lower) direction and the sheet discharge (front-back) direction.

Figure 6:
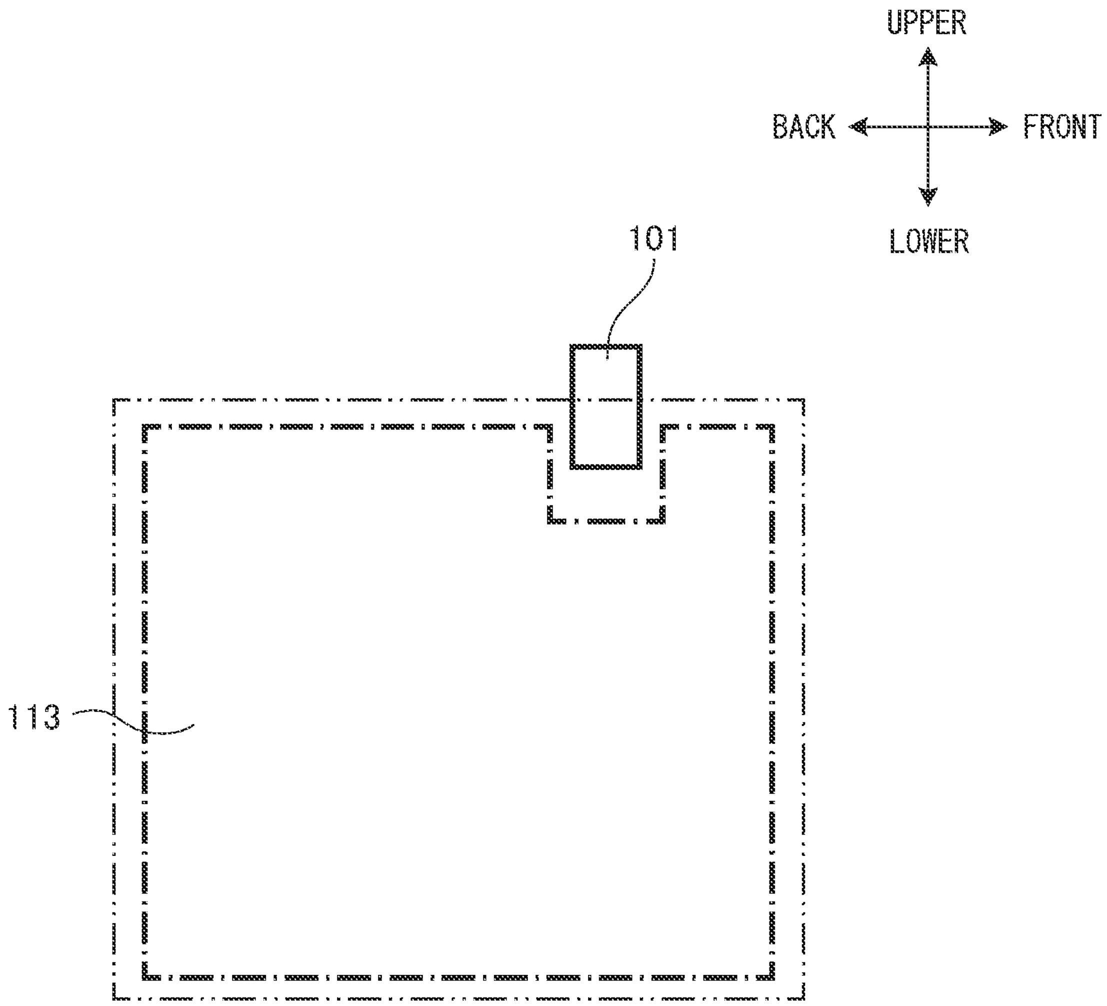
FIG. 6 is a diagram for illustrating an overlap between the USB board and the main control board.

To be noted, the state where at least the part of the USB board 150 overlapping the main control board 113 includes an embodiment shown in FIG. 6. That is, the main control board 113 need not be in a simple rectangular shape (refer to a dot dash line in FIG. 6) but can includes a cut-off portion (refer to a two-dot dash line in FIG. 6). The at least partly overlapping state includes the embodiment of FIG. 6 where at least a part of the USB port 101 included in the USB board 150 overlaps the main control board 113 with respect to the simplified rectangular shape, ignoring the cut-off portion.

The USB board 150 and the main control board 113 supported on both surfaces of the board support plate 114 are electrically connected to each other by the connecting cable 115 in a manner capable of inputting and outputting the data. A first end of the connecting cable 115 is connected to a first connector unit 134 disposed on the main control board 113, and a second end of the connecting cable 115 is connected to a second connector unit 150C disposed on the USB board 150. The first and second connector units 134 and 150C are disposed to the upper side than the center of the main control board 113 with respect to the vertical direction.

Then, a cable guide 116 bridging a gap between the main control board 113 and the USB board 150 is disposed on the board support plate 114, and guides the connecting cable 115 between the main control board 113 and the USB board 150 by holding the connecting cable 115. That is, the cable guide 116 is extended between the main control board 113 and the USB board 150. This cable guide 116 is disposed so as to facilitate the routing of the connecting cable 115 by a worker performing assembly and maintenance and prevent the damage of the connecting cable 115 by surrounding components due to the impact produced during the transportation of the apparatus.

As described above, the USB board 150 and the main control board 113 are supported on both surfaces of the board support plate 114, and the first and second connector units 134 and 150C are disposed to the upper side than the center of the main control board 113 with respect to the vertical direction. Thereby, it is possible to shorten the length of the connecting cable 115, and possible to form the cable guide 116 in a minimum size.

The USB board 150 and the main control board 113, including the USB port 101, are secured to predetermined positions in the casing 1A at the same time by screwing the board support plate 114 described above to the left side plate frame 1FL. As shown in FIG. 7, the board support plate 114 is disposed between the left side plate frame 1FL and the left side of the side face covers 82 in the casing 1A with respect to the left-right direction. Further, the board support plate 114 is fixed to the left side plate frame 1FL so that the USB board 150 is disposed to a side of the sheet discharge tray 51 than the main control board 113 in the casing 1A. That is, the USB board 150 is disposed between the sheet discharge tray 51 and the main control board 113 in the left-right direction when viewed in the vertical direction. Thereby, same as the main control board 113, the USB board 150 is disposed to the outside than the sheet discharge tray 51 in the casing 1A with respect to the left-right direction by securing the board support plate 114 supporting the USB board 150 and the main control board 113 to the left side plate frame 1FL. That is, the USB board 150 is disposed in the casing 1A in such a manner that the USB board 150 does not overlap the sheet discharge tray 51 and the sheet discharge unit 70 in the left-right direction when viewed in the vertical direction. In the case of this embodiment, with respect to the left-right direction, the main control board 113 and the USB board 150 are disposed to the outside than the sheet discharge tray 51 and on the left end side, opposite to the right end side on which the operation unit 4 is disposed (refer to FIG. 1), of the upper face of the casing 1A. That is, the USB board 150 is disposed on a same side in the left-right direction as the main control board 113 with respect to the sheet discharge tray 51 when viewed in the vertical direction.

As described above, since, in this embodiment, the board support plate 114 supporting the USB board 150 and the main control board 113 on both surfaces is fixed to the casing 1A, the USB board 150 is disposed to the same side as the main control board 113 in the casing 1A with respect to the left-right direction. Thereby, the worker performing the assembly and the maintenance can easily perform the routing of the connecting cable 115 connecting the USB board 150 and the main control board 113 to each other inside of the casing 1A. Then, since it is possible to electrically connect the USB board 150 and the main control board 113 to each other without lengthening the length of the connecting cable 115, it is not necessary to dispose a protection member for protecting the connecting cable 115 from an electromagnetic disturbance. Therefore, it is possible to suppress the cost of the image forming apparatus 1, and possible to achieve the miniaturization of the image forming apparatus 1 since it is not necessary to secure space for routing the connecting cable 115 inside of the casing 1A. Further, by this embodiment, it is possible to obtain satisfactory accessibility to the USB port 101.

Further, since, in this embodiment, the USB board 150 mounting the USB port 101 is disposed to the side of the sheet discharge tray 51 than the main control board 113 in the casing 1A with respect to the left-right direction, it is possible to effectively utilize space below the USB port 101 in the vertical direction. Therefore, since it is not necessary to increase the size of the apparatus in comparison with a case where the USB board 150 is disposed to the outside than the main control board 113 in the casing 1A with respect to the left-right direction, it is possible to contribute to the miniaturization of the image forming apparatus 1.

Then, since the USB port 101 is disposed in the upper face of the casing 1A, in comparison with a case where the USB port 101 is disposed in the side face of the casing 1A, it is possible to decrease an installation area of the image forming apparatus 1, including an area to be secured for the insertion and removal of the USB memory 400 with respect to the left-right direction. Further, while the USB memory 400 projects from the upper face of the casing 1A in a case where the USB memory 400 is attached, since the user is less likely to be caught with the USB memory 400, the USB memory 400, the USB board 150, and the like are less likely to be damaged.

Other Embodiments

To be noted, while, in the embodiment described above, a case where the main control board 113 (and the USB board 150) is disposed to the left side in the back of the casing 1A is shown (refer to FIG. 1), it is acceptable to dispose the main control board 113 (and the USB board 150) to the left side in the front, to the right side in the back, or to the right side in the front of the casing 1A.

Figure 8:
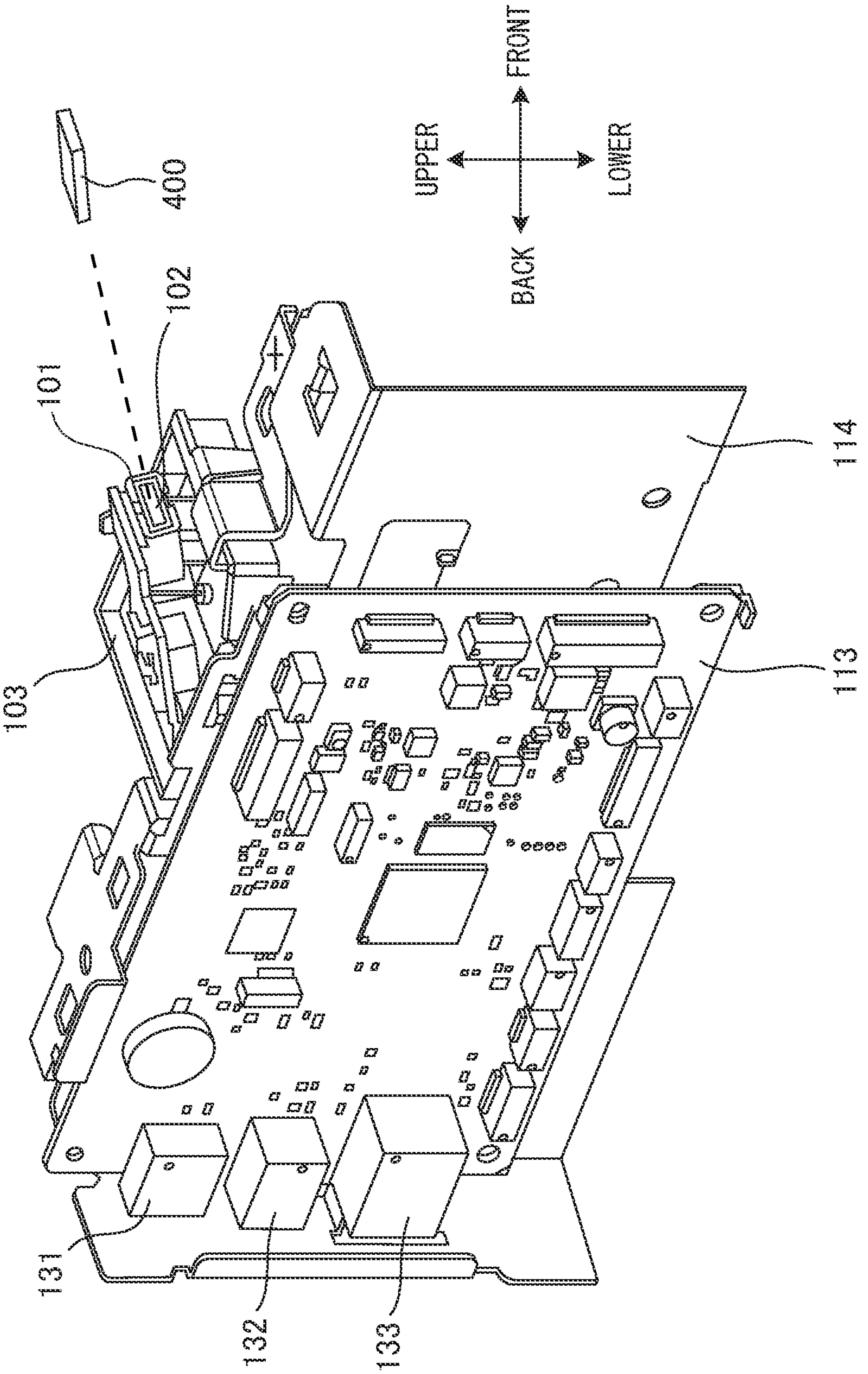
FIG. 8 is a perspective view showing the disposition of the USB port in the other embodiment.

To be noted, while, in the embodiment described above, a case where the USB port 101 is disposed such that the insertion opening 102 of the USB memory 400 faces upward is shown (refer to FIGS. 1 and 4), it is not limited to this. For example, as shown in FIG. 8, it is acceptable that the USB port 101 is mounted such that, so as to obtain a posture of increasing a lateral length of the insertion opening 102 of the USB port 101 and an elevation angle of, for example, 30 to 45 degrees with respect to the horizontal direction, the USB port 101 faces the front face side and obliquely upward. That is, in this embodiment, the USB port 101 is disposed such that the insertion/removal direction of the USB memory 400 with respect to the insertion opening 102 is tilted to a side of the sheet discharge direction with respect to the vertical direction. That is, the USB port 101 is disposed such that the USB memory 400 is inserted into and removed from the insertion opening 102 in the insertion/removal direction. The insertion/removal direction is inclined such that a more downstream portion thereof in the sheet discharge direction is higher when viewed in the width direction. In a case where the USB port 101 is disposed as described above, instead of becoming necessary to secure a front space for the insertion/removal of the USB memory 400, it is possible to reduce an upper space. Therefore, for example, even in a case where a document reading apparatus, not shown, reading the image of a document is disposed on the upper side of the casing 1A with respect to the vertical direction, the user can easily visually recognize the insertion opening 102 of the USB memory 400, and can easily access to the USB port 101.

To be noted, while, in the embodiment described above, description is provided by using the portable USB memory 400, which the user can easily carry as the recording medium, as an example, it is not limited to this, and it is acceptable to use other portable recording media such as a super density (SD) card. In such a case, ports and electrical boards corresponding to the respective recording media are used also for the USB port 101 and the USB board 150.

To be noted, the embodiments described above are not limited to the image forming apparatus of the electrophotographic system forming the toner image on the recording material by using the developer containing the toner and a carrier, and it is acceptable to apply the embodiments to an image forming apparatus of the other system. For example, it is possible to apply the embodiments to an image forming apparatus of such as an ink jet system which forms the image by ejecting an ink to the recording material.

By this disclosure, it is possible to achieve the suppression of the cost of the apparatus and the miniaturization of the apparatus while ensuring the good accessibility for the user to the medium insertion/removal portion in which the insertion opening capable of inserting the recording medium is formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-194211, filed Nov. 30, 2021 which is hereby incorporated by reference herein in its entirety.

What is claimed is:

1. An image forming apparatus comprising:

an image formation unit configured to form an image on a recording material;

a casing accommodating the image formation unit;

a sheet discharge unit configured to discharge a recording material on which an image is formed by the image formation unit from an inside of the casing, and includes a pair of sheet conveyance rollers configured to form a nip portion to nip and convey the recording material by coming into contact with each other;

a supporting portion disposed on an upper part of the casing in a vertical direction and configured to support the recording material discharged by the sheet discharge unit;

a first electric board disposed in the casing at a position different from that of the supporting portion in a width direction so that the first electric board does not overlap the supporting portion in the width direction, which intersects the vertical direction and a sheet discharge direction of a recording material by the sheet discharge unit;

a second electric board including a medium insertion and removal portion that includes an insertion port into which a recording medium is insertable, the second electric board being configured to control an operation of data readout from a recording medium inserted into the insertion port; and a connecting cable configured to connect the first electric board and the second electric board to each other, wherein the second electric board is disposed in the casing so that the second electric board does not overlap the supporting portion in the width direction, wherein the second electric board is disposed on a same side in the width direction as the first electric board with respect to the supporting portion, wherein at least a part of the second electric board is disposed at the same position as that of the first electric board in the vertical direction and the sheet discharge direction so that the part of the second electric board overlaps the first electric board as viewed along the width direction, wherein the medium insertion and removal portion is disposed downstream of the pair of sheet conveyance rollers in the sheet discharge direction.

2. The image forming apparatus according to claim 1, wherein the second electric board is disposed between the supporting portion and the first electric board in the width direction.

3. The image forming apparatus according to claim 1, wherein the insertion port is exposed from an opening formed in an upper face of the casing.

4. The image forming apparatus according to claim 3, further comprising:

a cover configured to open and close the opening, wherein the cover is configured to move between an opening position where the opening is opened and a closed position where the opening is closed, the opening position allowing insertion and removal of a recording medium into and from the insertion port.

5. The image forming apparatus according to claim 3, wherein the medium insertion and removal portion is disposed so that a direction of insertion and removal of a recording medium into and from the insertion port is the vertical direction.

6. The image forming apparatus according to claim 3, wherein:

the medium insertion and removal portion is disposed so that a recording medium is insertable into and removable from the medium insertion and removal portion in an insertion and removal direction, and the insertion and removal direction is inclined so that a more downstream portion thereof in the sheet discharge direction is higher.

7. The image forming apparatus according to claim 1, wherein the medium insertion and removal portion is disposed downstream of a center of the first electric board in the sheet discharge direction.

8. The image forming apparatus according to claim 1, further comprising:

an operation unit disposed on a first end side of the casing in the width direction so that the operation unit does not overlap the sheet discharge unit in the width direction, wherein the first electric board and the second electric board are disposed on a second end side opposite to the first end side of the casing in the width direction so that the first electric board and the second electric board do not overlap the sheet discharge unit in the width direction.

9. The image forming apparatus according to claim 1, further comprising:

a plate shaped support member disposed in the casing, wherein the plate shaped support member supports the first electric board on a first face side of the support member and supports the second electric board on a second face side opposite to the first face side of the support member.

10. The image forming apparatus according to claim 9, wherein the first electric board and the second electric board are disposed so that a first back surface opposite to a first mounting surface of the first electric board faces a second back surface opposite to a second mounting surface of the second electric board.

11. The image forming apparatus according to claim 10, wherein the first mounting surface and the second mounting surface face the width direction.

12. The image forming apparatus according to claim 9, further comprising a support base disposed on the second face side of the support member and supporting the medium insertion and removal portion.

13. The image forming apparatus according to claim 9, wherein:

the casing includes a hold member and an exterior cover, the hold member is configured to hold an end of the image formation unit with respect to the width direction, the exterior cover is disposed so that the exterior cover does not overlap the hold member in the width direction and forms an exterior of the image forming apparatus, and the support member is disposed between the hold member and the exterior cover in the width direction.

14. The image forming apparatus according to claim 9, wherein:

the first electric board includes a first connector unit disposed upward of a center of the first electric board in the vertical direction and connected to a first end of the connecting cable, and the second electric board includes a second connector unit connected to a second end differing from the first end of the connecting cable.

15. The image forming apparatus according to claim 14, wherein the second connector unit is disposed upward of the center of the first electric board in the vertical direction.

16. The image forming apparatus according to claim 9, wherein:

the support member includes a cable guide extending between the first electric board and the second electric board, and the cable guide guides the connecting cable between the first electric board and the second electric board by holding the connecting cable.

17. The image forming apparatus according to claim 1, wherein the first electric board is a main control board configured to control of a whole apparatus.

18. An image forming apparatus comprising:

an image formation unit configured to form an image on a recording material;

a casing accommodating the image formation unit;

a sheet discharge unit configured to discharge a recording material on which an image is formed by the image formation unit from an inside of the casing;

a supporting portion disposed on an upper part of the casing in a vertical direction and configured to support the recording material discharged by the sheet discharge unit;

a first electric board disposed in the casing at a position different from that of the supporting portion in a width direction so that the first electric board does not overlap the supporting portion in the width direction, which intersects the vertical direction and a sheet discharge direction of a recording material by the sheet discharge unit;

a second electric board including a medium insertion and removal portion that includes an insertion port into which a recording medium is insertable, the second electric board being configured to control an operation of data readout from a recording medium inserted into the insertion port;

a connecting cable configured to connect the first electric board and the second electric board to each other; and an operation unit disposed on a first end side of the casing in the width direction so that the operation unit does not overlap the sheet discharge unit in the width direction, wherein the second electric board is disposed in the casing so that the second electric board does not overlap the supporting portion in the width direction, wherein the second electric board is disposed on a same side in the width direction as the first electric board with respect to the supporting portion, wherein at least a part of the second electric board is disposed at the same position as that of the first electric board in the vertical direction and the sheet discharge direction so that the part of the second electric board overlaps the first electric board as viewed along the width direction, wherein the first electric board and the second electric board are disposed on a second end side opposite to the first end side of the casing in the width direction so that the first electric board and the second electric board do not overlap the sheet discharge unit in the width direction.

* * * * *